United States Patent
Kosar

(10) Patent No.: US 8,086,238 B1
(45) Date of Patent: Dec. 27, 2011

(54) HLR-DUAL CIRCUIT SWITCHED AND PACKET SWITCHED REGISTRATION SUPPORT

(75) Inventor: Erik Kosar, Richardson, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 13/098,163

(22) Filed: Apr. 29, 2011

(51) Int. Cl.
*H04W 40/00* (2009.01)

(52) U.S. Cl. .............. 455/445; 455/433; 455/435.1; 455/552.1

(58) Field of Classification Search .......... 455/433, 455/435.1, 435.2, 434, 432.1, 445, 446, 412.1, 455/550.1, 552.1, 560; 370/328, 352, 395.1; 709/220, 230, 228, 229
See application file for complete search history.

(56) References Cited

U.S. PATENT DOCUMENTS

| | | | |
|---|---|---|---|
| 6,230,017 | B1 | 5/2001 | Andersson et al. |
| 6,389,008 | B1 | 5/2002 | Lupien et al. |
| 6,505,044 | B1 | 1/2003 | Back et al. |
| 6,628,645 | B2 | 9/2003 | Scheurich |
| 6,791,988 | B1 | 9/2004 | Hameleers et al. |
| 6,912,230 | B1 | 6/2005 | Salkini et al. |
| 6,950,876 | B2 | 9/2005 | Bright et al. |
| 7,031,747 | B2 | 4/2006 | Cyr et al. |
| 7,085,260 | B2 | 8/2006 | Karaul et al. |
| 7,228,143 | B1 | 6/2007 | Hamalainen et al. |
| 7,340,250 | B2 | 3/2008 | Sanchez |
| 7,522,921 | B2 | 4/2009 | Thompson |
| 7,668,158 | B2 | 2/2010 | Armistead |
| 2003/0039237 | A1 | 2/2003 | Forslow |
| 2004/0219935 | A1 | 11/2004 | McCann et al. |
| 2006/0221890 | A1 | 10/2006 | Qian et al. |
| 2008/0070601 | A1 | 3/2008 | Brueckheimer et al. |
| 2008/0214190 | A1 | 9/2008 | Aalto |
| 2010/0077459 | A1 | 3/2010 | Mahdi et al. |
| 2010/0118861 | A1 | 5/2010 | Witzel et al. |
| 2010/0222052 | A1 | 9/2010 | Barzegar et al. |
| 2010/0296483 | A1 | 11/2010 | Sayeedi et al. |

FOREIGN PATENT DOCUMENTS

WO 0122766 A1 3/2001

OTHER PUBLICATIONS

Jeffrey Bannister, "Convergence technologies for 3G networks: IP, UMTS, EGPRS and ATM", 2004. http://books.google.com/books?id=5VHRWcC_WMIC.

Erik Dahlman, "UMTS/IMT-2000 Based on Wideband CDMA", Aug. 2002. http://paginas.fe.up.pt/~mricardo/03_04/tsc/artigos/dahl.pdf.

(Continued)

*Primary Examiner* — Jean Gelin
(74) *Attorney, Agent, or Firm* — Howison & Arnott, L.L.P.

(57) ABSTRACT

A method and system for managing services for a mobile station by a network service provider includes receiving a first registration request associated with the mobile station at a registration node, registering a first switching node as a first serving node for access by the mobile station to a first network, receiving a second registration request associated with the mobile station at the registration node, and registering a second switching node as a second serving node for access by the mobile station to a second network. The first serving node and the second serving node are concurrently maintained. The method further includes receiving a service request for providing a network service to the mobile station, and routing the service request to either the first switching node or the second switching node in accordance with routing rules associated with the mobile station configured by the network service provider.

20 Claims, 2 Drawing Sheets

OTHER PUBLICATIONS

Peyman TalebiFard, "Integration of Heterogenious Wireless Access networks with IP Multimedia", Master's thesis, 2008. https://circle.ubc.ca/bitstream/handle/2429/2893.

B.S. Manoj, "On the Use of multiple hops in next generation wireless systems," Wireless Networks, vol. 12 Issue 2, Mar. 2006. http://www.cs.berkeley.edu/~kjk/mhops.pdf.

Ahmadi, Hamid; Denzel, Wolfgang E.; Murphy, Charles A.; Port, Erich TI—"A high-performance switch fabric for integrated circuit and packet switching" International Journal of Digital & Analog Cabled Systems, vol. 2, Issue 4, 1989. http://dx.doi.org/10.1002/dac.4520020411.

Bolla, R.; Davoli, F.; Maryni, P.; Parisini, T.; "A neural strategy for optimal multiplexing of circuit- and packet-switched traffic" Global Telecommunications Conference, Orlando, FL , USA, 1992. Conference Record., GLOBECOM '92. Communication for Global Users., IEEE. Dec. 6-9, 1992. On pp. 1324-1330 vol. 3; INSPEC Accession No. 4482815; DOI: 10.1109/GLOCOM.1992.276607 http://ieeexplore.ieee.org/xpl/freeabs_all.jsp?arnumber=276607.

Fischer, M.; Harris, T.; "A Model for Evaluating the Performance of an Integrated Circuitand Packet-Switched Multiplex Structure" Communications, IEEE Transactions on, Feb. 1976, vol. 24, Issue:2, on pp. 195-202; ISSN: 0090-6778; DOI: 10.1109/TCOM.1976.1093282 http://ieeexplore.ieee.org/xpl/freeabs_all.jsp?arnumber=1093282.

Weinstein, C.; Malpass, M.; Fisher, M.; "Data Traffic Performance of Integrated Circuitand Packet-Switched Multiplex Structure" Communications, IEEE Transactions on, Jun. 1980, vol. 28, Issue:6, on pp. 873-878; ISSN: 0090-6778; DOI: 10.1109/TCOM.1980.1094726 http://ieeexplore.ieee.org/xpl/freeabs_all.jsp?arnumber=1094726.

HLR-DUAL CIRCUIT SWITCHED AND PACKET SWITCHED REGISTRATION SUPPORT

TECHNICAL FIELD

Embodiments of the invention relate to dual registration of a mobile station in a home location register to allow for simultaneous circuit-switched and packet-switched registration.

BACKGROUND

As the mobile communication industry evolves increasingly towards the use of packet-switched networks, there is a need to support the operation of a mobile station in both a circuit-switched networks and packet-switched networks. Traditionally, a mobile station must de-register from the mobile switching center (MSC) serving the circuit-switched network and register with the MSC serving the packet-switch network before the mobile station can receive services over the packet-switched network.

SUMMARY

A method for managing services for a mobile station by a network service provider includes receiving a first registration request associated with the mobile station at a registration node and in response to receiving the first registration request, registering a first switching node as a first serving node for access by the mobile station to a first network at the registration node. The method further includes receiving a second registration request associated with the mobile station at the registration node, and in response to receiving the second registration request, registering a second switching node as a second serving node for access by the mobile station to a second network at the registration node, wherein the first serving node and the second serving node are concurrently maintained. The method still further includes receiving a service request for providing a network service to the mobile station, and routing the service request to either the first switching node or the second switching node in accordance with routing rules associated with the mobile station stored in the registration node. The routing rules are configured by the network service provider.

A system for managing services for a mobile station by a network service provider includes a first switching node serving a first network, a second switching node serving a second network, and a registration node for storing routing rules associated with the mobile station. The routing rules are configured by the network service provider. The registration node is further configured to receive a first registration request, the first registration request being associated with the mobile station, and in response to receiving the first registration request, register a first switching node as a first serving node for access by the mobile station to the first network. The registration node is further configured to receive a second registration request, the second registration request being associated with the mobile station, and in response to receiving the second registration request, register a second switching node as a second serving node for access by the mobile station to the second network, wherein the first serving node and the second serving node are concurrently maintained. The registration node is still further configured to receive a service request for providing a network service to the mobile station, and route the service request to either the first switching node or the second switching node in accordance with the routing rules.

BRIEF DESCRIPTION OF THE DRAWINGS

For a more complete understanding, reference is now made to the following description taken in conjunction with the accompanying Drawings in which.

DETAILED DESCRIPTION

Figure 1:
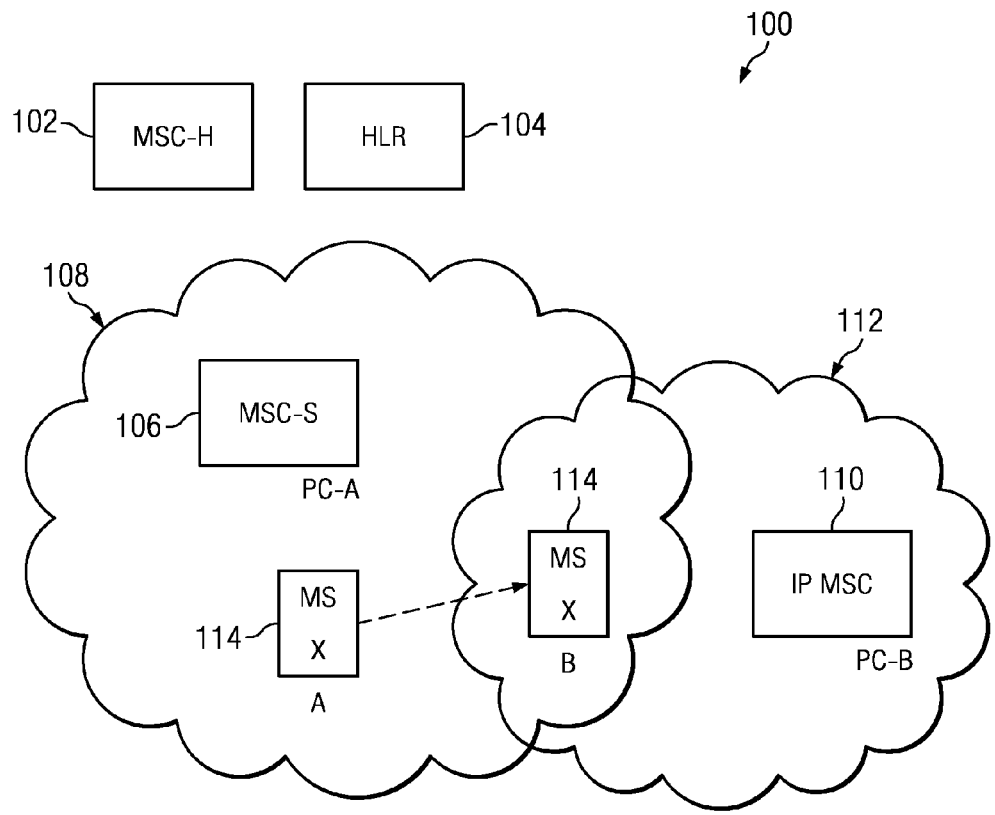
FIG. 1 illustrates an embodiment of a system for home location register (HLR) dual circuit-switched and packet-switched registration support.

Referring now to the drawings, wherein like reference numbers are used herein to designate like elements throughout, the various views and embodiments of HLR-dual circuit switched and packet switched registration support are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Embodiments of a system and method for providing dual circuit-switched and packet-switched registration support in a home location register (HLR) are described herein. In various embodiments, an HLR is enhanced to allow for simultaneous circuit-switched and packet-switched registration of a user's mobile station to allow the mobile station to be serviced in either or both the circuit-switched and packet-switched domain. For example, during a call delivery if the HLR has both circuit-switched and packet-switched registration for a mobile station, the call can be delivered to the mobile station through the circuit-switched domain, the packet-switched domain, or both. In various embodiments, the determination of whether a particular service for a particular mobile station will be delivered by the circuit-switched domain, the packet-switched domain, or both is configured by a network operator associated with a network service provider. Alternately, the domain selection could be selected by the subscriber as a subscriber setting. In particular embodiments, the network operator configures routing rules within the HLR that are used to determine whether a particular service for a particular mobile station will be delivered by the circuit-switched domain, the packet-switched domain, or both.

FIG. 1 illustrates an embodiment of a system 100 for home location register (HLR) dual circuit-switched and packet-switched registration support. The system 100 includes a home mobile switching center (MSC-H) 102, a home location register (HLR) 104, a circuit-switched mobile switching center (MSC-S) 106 having a circuit-switched service area 108, a packet-switched mobile switching center (IP MSC) 110 having a packet-switched coverage area 112, and a mobile station (MS) 114. In various embodiments, the MSC-H 102 is responsible for routing voice calls and other network services such as messaging and data services to subscriber mobile devices within a network service provider's network. The MSC-H 102 sets up and releases end-to-end connections and handles mobility as well as handover requirements during a call. The MSC-H 102 determines the location of a subscriber's mobile station 114 within one or more network domains such as that of the MSC-S 106 and/or the IP MSC 110. The MSC-H 102 also interfaces with the public switched telephone network (PSTN) and all mobile-to-mobile and PSTN-to-mobile calls are routed through the MSC-H 102. Although various embodiments are illustrated as using a mobile switching center, it should be understood that in other embodiments any network switching node may be used.

The HLR 104 includes a database of permanent subscriber information for subscribers of the network service provider's network. The HLR 104 is maintained by the network service provider and includes information associated with a subscriber such as a unique identifier associated with the subscriber, such as a mobile identification number, as well as subscriber preferences. The HLR 104 further stores location information associated with a particular subscriber which identifies the current location of the MS 114 within the service provider network. The current location information identifies a mobile switching center to which the MS 114 is currently registered as well as identifying the mobile switching center as the serving mobile switching center for the mobile station. In various embodiments, the HLR 104 is provided with the capability to maintain dual registrations of an MS 114 by storing two different mobile switching centers as the serving mobile switching center for the particular subscriber as will be further described herein. During receipt of a call or a request for services directed to the MS 114 at the MSC-H 102, the MSC-H 102 queries the HLR 104 for the current location information associated with the mobile subscriber 114 so that the call or service request can be routed to the MSC currently serving the MS 114 to which the MS 114 is registered. Although various embodiments are described herein as using an HLR, it should be understood that in other embodiments any network registration node may be used.

The MSC-S 106 is a mobile switching center which services a circuit-switched network encompassing the circuit-switched coverage area 108. In a particular embodiment, the circuit-switched network is a CDMA network. In still other embodiments, the circuit-switched network may be a GSM network or any other type of circuit-switched network domain. The MSC-S 106 provides circuit-switched services to mobile subscribers such as MS 114 that are currently registered with the MSC-S 106 and to which the MSC-S 106 is acting as a serving mobile switching center. Examples of circuit-switched services provided by the MSC-S 106 to mobile stations located within the circuit-switched coverage area 108 include voice calls, SMS messaging, and circuit-switched data services. Although various embodiments are described herein as using MSC-S 106, it should be understood that in other embodiments any circuit-switched network switching node may be used.

IP MSC 110 is a mobile switching center that serves a packet-switched network encompassing the packet-switched coverage area 112. The IP MSC 110 provides packet-switched services to mobile subscribers such as MS 114 that are currently registered with the IP MSC 110 and to which the IP MSC 110 is acting as a serving mobile switching center. Examples of packet-switched services which may be provided by the IP MSC 110 to mobile stations within the packet-switched coverage area 112 include voice-over IP (VoIP) services and packet data services. In at least one embodiment, the packet-switched network is an internet protocol (IP) network. In still other embodiments, the packet-switched network may be an LTE network, a WiFi network or any other type of packet-switched network. Although various embodiments are described herein as using IP MSC 110, it should be understood that in other embodiments any packet-switched network switching node may be used.

MS 114 is a mobile subscriber station associated with a particular subscriber. In at least one embodiment, the MS 114 is a dual-mode mobile device which includes circuitry that allows the MS 114 to establish connections and communicate data over both a circuit-switched network and a packet-switched network. In various embodiments, the MS 114 may include a mobile telephone, a smart phone, a PDA, a touchpad or any other mobile communication device.

In various embodiments, a network operator configures the HLR 104 to allow registration of a particular mobile station MS 114 with either or both of the MSC-S 106 or the IP MSC 110. The network operator further configures the HLR 104 to set routing preferences for various services provided by the MS 114. In particular, the network operator determines whether a particular call or service request will be routed to the MS 114 by either the MSC-S 106, the IP MSC 110, or both.

Figure 2:
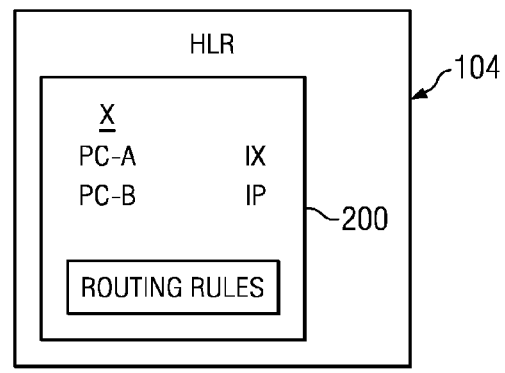
FIG. 2 illustrates an embodiment of a database structure for the HLR of FIG. 1.

FIG. 2 illustrates an embodiment of a database structure 200 for the HLR 104. In the particular embodiment illustrated in FIG. 2, the MSC-S 106 and the IP MSC 110 are identified within the network by using an SS7 point code. The point code is a unique address which identifies a node in a network. In particular embodiments, the point code may be 24 bits, 16 bits, or 14 bits in length. In the particular embodiments illustrated in FIGS. 1 and 2, the MSC-S 106 is identified by point code PC-A and the IP MSC 110 is identified by point code PC-B. Although in the present embodiment the MSC-S 106 and the IP MSC 110 are identified using point codes, it should be understood that in other embodiments other types of identifiers may be used. The MS 114 is also provided with a mobile identification number which uniquely identifies the MS 114. In the particular embodiment illustrated in FIGS. 1 and 2, MS 114 is identified by mobile identification number X. Although in the present embodiment, the MS 114 is identified by a mobile identification number, it should be understood that in other embodiments other types of identifiers may be used to identify MS 114.

Referring again to FIG. 2, the database of the HLR 104 is configured such that the mobile identifier X associated with MS 114 is associated with both point code PC-A and point code PC-B. Point code PC-A is further associated with a network type identifier IX, which identifies the MSC-S 106 as a circuit-switched network to the HLR 104. In a particular embodiment, the network type identifier IX identifies the circuit-switched network as a CDMA network, however in other embodiments the network type identifier IX may identify the circuit-switched network as a GMS network. The point code PC-B is associated with a network type identifier IP which identifies the IP MSC 110 as a packet-switched network with circuit signaling capabilities to the HLR 104. It should be noted that both point codes represent a circuit address and that it is up to the HLR 104 to tag them appropriately as IP or circuit based nodes. The HLR 104 database further includes routing preferences associated with the mobile identification number X which are used by one or more routing algorithms to determine whether a particular request for services to be provided to MS 114 will be routed to the MS 114 using the circuit-switched network, the packet-switched network, or both. In various embodiments, these routing preferences are configured by the network operator associated with the network service provider. For example, the network operator may set the routing preferences for the MS 114 such that incoming voice calls are routed through MSC-S 106 to the MS 114, while internet services are provided to the MS 114 by the IP MSC 110. It should be understood that the particular database structure 200 illustrated in FIG. 2 is shown for illustrative purposes and that in other embodiments other database structures for the HLR 104 may be used.

Figure 3:
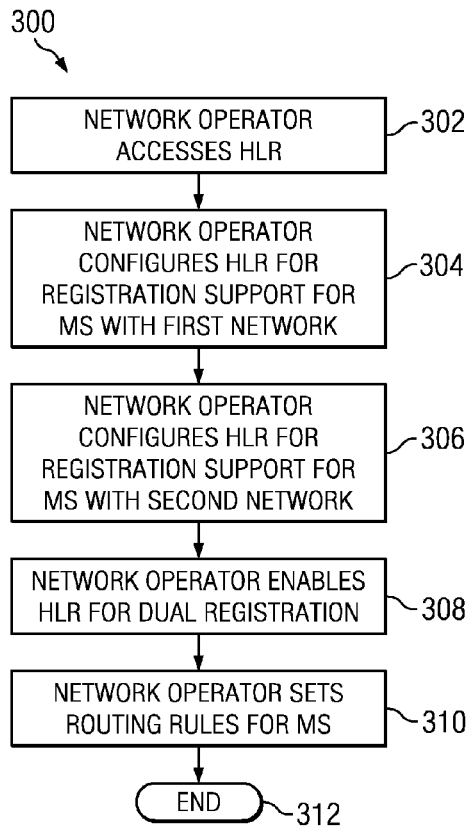
FIG. 3 illustrates an embodiment of a procedure for network operator provisioning of the HLR for dual circuit-switched and packet-switched registration support.

FIG. 3 illustrates an embodiment of a procedure 300 for network operator provisioning of the HLR 104 for dual circuit-switched and packet-switched registration support. In step 302, a network operator accesses the HLR 104. In a particular embodiment, the network operator may access the HLR 104 by logging in to a configuration interface to the HLR 104. In step 304, the network operator configures the HLR 104 for registration support for the MS 114 with a first network by associating the mobile identification number of the MS 114 with a mobile switching center serving the first network. In various embodiments, the first network is a circuit-switched network. In at least one embodiment, the network operator may configure the HLR 104 for registration support for MS 114 with the first network by enabling single registration for circuit-based MSCs within the HLR 104 and provisioning a list of circuit-switched point codes, such as CDMA/1x point codes, within the HLR 104. For example, in a particular embodiment the network operator may provision the HLR 104 with the point code "PC-A" of the MSC-S 106. In addition, in a particular embodiment the network operator may enter data into the database structure 200 to identify the MSC-S 106 as a circuit-switched network. The configuration of the HLR 104 for support of the MS 114 with the first network allows the mobile switching center of the first network to provide services to the MS 114 upon registration of the MS 114 with the mobile switching center.

In step 306, the network operator configures the HLR 104 for registration support for the MS 114 with the second network by associating the mobile identification number of the MS 114 with a mobile switching center serving the second network. In various embodiments, the second network is a packet-switched network. In at least one embodiment, the network operator may configure the HLR 104 for registration support for the MS 114 with the second network by provisioning a list of packet-switched nodes represented by SS7 point codes, such as IP MSC SS7 point codes, within the HLR 104. For example, in a particular embodiment the network operator may provision the HLR 104 with the point code "PC-B" of the IP MSC 110. In addition, in a particular embodiment the network operator may enter data into the database structure 200 to identify the IP MSC 110 as a packet-switched network. The configuration of the HLR 104 for support of the MS 114 with the second network allows the mobile switching center of the second network to provide services to the MS 114 upon registration of the MS 114 with the mobile switching center.

In step 308, the network operator enables the HLR 104 for dual registration with the first network and the second network. This enables the HLR 104 to register mobile stations, such as MS 114, with either the first network, the second network, or both the first network or the second network simultaneously. In a particular embodiment, the HLR 104 will then compare incoming point code addresses against the circuit-switched list and the packet-switched list to determine whether to register as point code "PC-A" or point code "PC-B."

In step 310, the network operator sets routing rules for MS 114 that determine to which mobile switching center a particular service request or incoming call for MS 114 will be directed. In at least one embodiment, the routing rules may fall into two categories. A first category of routing rules are global routing rules which apply to any mobile station that is registered with the HLR 104. The second category or routing rules are subscriber-based rules whereby the routing rules could apply differently for each individual subscriber. In a particular embodiment, the network operator sets the routing rules by entering data into the database structure 200 to associate particular services with either the first network, the second network, or both the first and second network. In step 312, the procedure 300 ends. Upon completion of the procedure 300, the MS 114 is configured to support dual registration within the HLR 104 to allow simultaneous registration of the MS 114 with both a first and second network such as a circuit-switched network and a packet-switched network as long as the MS 114 is within the respective coverage areas of each. Accordingly, in various embodiments the network operator is provided with the capability of determining whether delivery of a particular service to a particular mobile station is be performed using the circuit-switched network, the packet-switched network, or both the circuit-switched and the packet-switched network.

Figure 4:
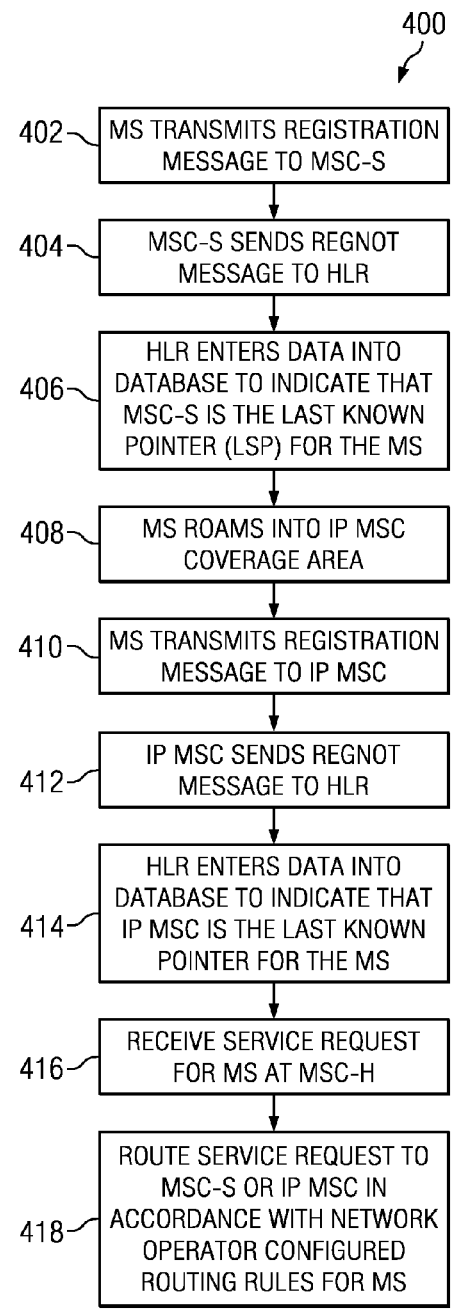
FIG. 4 illustrates an embodiment of a procedure for dual registration of a mobile station with both a circuit-switched network and a packet-switched network.

FIG. 4 illustrates an embodiment of a procedure 400 for dual registration of a mobile station with both a circuit-switched network and a packet-switched network. In the procedure illustrated in FIG. 4, the MS 114 is located at a position A within the circuit-switched coverage area 108 served by the MSC-S 106 but not currently within the packet-switched coverage area 112 served by IP MSC 110. In step 402, the MS 114 transmits a registration request message to MSC-S 106. In response to receipt of the registration request, the MSC-S 106 sends a REGNOT message to the HLR 104. In step 406, in response to receipt of the REGNOT message from the MSC-S 106, the HLR 104 registers the MS 114 and enters data into the database structure 200 to indicate that MSC-S 106 is the last seen pointer (LSP) for MS 114. The LSP indicates that MSC-S 106 is a serving MSC for MS 114. The MS 114 may now receive services using the circuit-switched network served by MSC-S 106.

In step 408, the MS 114 roams into a location B within the packet-switched coverage area 112 served by IP MSC 110 while still within the circuit-switched coverage area 108 served by MSC-S 106. In step 410, MS 114 transmits a registration message to IP MSC 110. In response to receiving the registration message, IP MSC 110 sends a REGNOT message to HLR 104 in step 412. In step 414, the HLR 104 registers the MS 114 and enters data into the database to indicate that IP MSC 110 is the LSP for the MS 114. The LSP indicates that IP MSC 110 is a serving MSC for MS 114. The MS 114 may now receive services using the packet-switched network served by IP MSC 110. Accordingly, MS 114 is registered in the HLR 104 such that it is able to receive services from both the MSC-S 106 and IP MSC 110 in accordance with the network operator configured routing rules and the first serving node and the second serving node are concurrently maintained.

In step 416, a service request message for MS 114 is received at MSC-H 102. Examples of service request messages include an incoming voice call or an SMS message. In step 418, the service request is routed to either the MSC-S 106 or the IP MSC 110 in accordance with the network operator configured routing rules for the particular MS 114. For example, the network operator may configure their routing rules for MS 114 such that voice calls are routed to the MSC-S 106 while requests for messaging services are routed to the IP MSC 110. The use of multiple registrations in the HLR 104 enables the parsing of services among multiple mobile switching centers and the associated routing of service requests to a desired mobile switching center as determined by the network operator. An advantage of dual registration provided in some embodiments is that a request for service may be routed to either the circuit-switched or the packet-switched network quickly without requiring re-registration of the MS 114 with a new network.

The network operator configured rules for routing of messages to the MS 114 allows the network operator to control the sending of messages and establishment of services within the network service provider's network. For example, a location request message (LOCREQ) is a message sent by the HLR 104 to locate a mobile station as MS 114 within the network. The routing rules allow the network operator to determine whether the LOCREQ message is sent to MSC-S 106, IP MSC 110, or both in accordance with the network operator's routing preferences. A QALDR message is sent by the HLR 104 whenever a subscriber profile changes. By the use of the network operator configured routing rules, the QALDR message may be sent to either the MSC-S 106 or IP MSC 110 or both depending on the desires of the network operator. Similarly, an SMSREQ message is sent by the HLR 104 to determine where a text message addressed to the MS 114 is to be directed. By use of the network operator configured routing rules, the network operator can specify whether the SMS message should be sent to the circuit-switched network or the packet-switched network. In still other embodiments, the network operator may configure the HLR 104 to determine whether a particular MS 114 may register with the MSC-S 106 or the IP MSC 110 et al. In accordance with varying embodiments, a network operator is provided with the capability to manage the network in accordance with the capabilities and desires of the network service provider. For example, a network operator may use the dual registration and routing rules to transition certain services from circuit-switched networks to packet-switched networks as the capability of the network service provider's networks change to support enhanced packet-switched network services.

Although various embodiments described herein are illustrated using an HLR having the capability of dual mode registration, it should be understood that in other embodiments an HLR may be provided having the capability to register a mobile station with any number of different network types.

It will be appreciated by those skilled in the art having the benefit of this disclosure that this HLR-dual circuit-switched and packet-switched registration support provides an enhanced HLR to allow for simultaneous circuit-switched and packet-switched registration of a user's mobile station to allow the mobile station to be serviced in either or both the circuit-switched and packet-switched domain under control of a network operator. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for managing services for a mobile station by a network service provider comprising:

receiving a first registration request at a registration node, the first registration request being associated with the mobile station;

in response to receiving the first registration request, registering a first switching node as a first serving node for access by the mobile station to a first network at the registration node;

receiving a second registration request at the registration node, the second registration request being associated with the mobile station;

in response to receiving the second registration request, registering a second switching node as a second serving node for access by the mobile station to a second network at the registration node, wherein the first serving node and the second serving node are concurrently maintained;

receiving a service request for providing a network service to the mobile station; and routing the service request to either the first switching node or the second switching node in accordance with routing rules associated with the mobile station stored in the registration node, the routing rules being configured by the network service provider, wherein the routing rules include a unique routing rule for a particular mobile station, the unique routing rule determining whether a particular service for the particular mobile station is to be routed to the first switching node, the second switching node, or the first switching node and the second switching node.

2. The method of claim 1, wherein the registration node comprises a Home Location Register (HLR).

3. The method of claim 1, wherein the first network comprises a circuit-switched network.

4. The method of claim 3, wherein the circuit-switched network comprises at least one of a CDMA network or a GSM network.

5. The method of claim 1, wherein the second network comprises a packet-switched network.

6. The method of claim 5, wherein the packet-switched network comprises an IP network.

7. The method of claim 1, wherein the first switching node comprises a circuit-switched Mobile Switching Center (MSC).

8. The method of claim 1, wherein the second switching node comprises a packet-switched Mobile Switching Center (MSC).

9. The method of claim 1, further comprising:

accessing the registration node by a network operator associated with the network service provider;

configuring, by the network operator, the registration node for registration support for the mobile station with the first network; and configuring, by the network operator, the registration node for registration support for the mobile station with the second network.

10. The method of claim 1, further comprising:

accessing the registration node by a network operator associated with the network service provider; and configuring the routing rules associated with the mobile station by the network operator, the routing rules indicating that a particular network service is to be routed to one of the first switching node, the second switching node, or the first switching node and the second switching node.

11. A system for managing services for a mobile station by a network service provider comprising:

a first switching node serving a first network;

a second switching node serving a second network; and a registration node for storing routing rules associated with the mobile station, the routing rules being configured by the network service provider, wherein the routing rules include a unique routing rule for a particular mobile station, the unique routing rule determining whether a particular service for the particular mobile station is to be routed to the first switching node, the second switching node, or the first switching node and the second switching node, the registration node further being configured to:
- receive a first registration request, the first registration request being associated with the mobile station;
- in response to receiving the first registration request, register a first switching node as a first serving node for access by the mobile station to the first network;
- receive a second registration request, the second registration request being associated with the mobile station;
- in response to receiving the second registration request, register a second switching node as a second serving node for access by the mobile station to the second network, wherein the first serving node and the second serving node are concurrently maintained;
- receive a service request for providing a network service to the mobile station; and
- route the service request to either the first switching node or the second switching node in accordance with the routing rules.

12. The system of claim 11, wherein the registration node comprises a Home Location Register (HLR).

13. The system of claim 11, wherein the first network comprises a circuit-switched network.

14. The system of claim 13, wherein the circuit-switched network comprises at least one of a CDMA network or a GSM network.

15. The system of claim 11, wherein the second network comprises a packet-switched network.

16. The system of claim 15, wherein the packet-switched network comprises an IP network.

17. The system of claim 11, wherein the first switching node comprises a circuit-switched Mobile Switching Center (MSC).

18. The system of claim 11, wherein the second switching node comprises a packet-switched Mobile Switching Center (MSC).

19. The system of claim 11, wherein the registration node is further configured to:
- receive access by a network operator associated with the network service provider;
- receive first configuration information from the network operator for registration support for the mobile station with the first network; and
- receive second configuration information from the network operator for registration support for the mobile station with the second network.

20. The system of claim 11, wherein the registration node is further configured to:
- receive access by a network operator associated with the network service provider; and
- receive configuration information from the network operator for configuring the routing rules associated with the mobile station, the routing rules indicating that a particular network service is to be routed to one of the first switching node, the second switching node, or the first switching node and the second switching node.

* * * * *